UNITED STATES PATENT OFFICE.

MAXIMILIAN ZINGLER, OF LONDON, ENGLAND.

COMPOSITION FOR TREATING DECAYED OR OTHER RUBBER.

SPECIFICATION forming part of Letters Patent No. 630,435, dated August 8, 1899.

Application filed December 6, 1898. Serial No. 698,446. (No specimens.)

*To all whom it may concern:*

Be it known that I, MAXIMILIAN ZINGLER, a subject of the Queen of Great Britain and Ireland, residing at London, England, have invented a new and useful Composition for Treating Decayed or other Rubber, of which the following is a specification.

This invention relates to the treatment of decayed or other rubber, and has for its object the production from decayed, oxidized, or deteriorated rubber of a product which is purified and desiccated, and therefore can easily and quickly be dried and will not afterward absorb moisture, and added to this advantage it has gained considerably in tensile strength and solidity by the thorough coagulation of the vegetable albumen and the contraction of its gummy and oleaginous particles. Such product is adapted for commercial use for any purposes to which rubber is applicable and for vulcanizing in the usual way. It can be kept or preserved for a long time without deterioration, and a great saving of time in drying the rubber is gained, as the same can be effected in as many hours as by the known processes weeks are required.

To carry my improved process into effect, I first wash the rubber in the usual way through washing-machines to remove all dirt therefrom and to draw it out into thin sheets, which is technically known as "crushed" rubber. I then immerse in an appropriate earthenware vessel or wooden vat the clean crushed rubber for one or two days or longer, according to the nature or quality of the rubber in the following solution:

My solution consists, essentially, of tannic acid or its equivalent from bodies containing tannates or tannic acid—such as catechu, extracts of oak or willow bark, and the like—and metallic salts, such as tartar emetic, and sulfites, such as calcium sulfite, and for one hundred pounds of rubber a good average solution would have the following proportions: In thirty or forty gallons of water at 212° Fahrenheit I dissolve about fifty-one pounds of tartar emetic and add seven and one-half pounds or more of pure commercial tannic acid or its equivalent in substances containing such, and, finally, about two and one-half pounds of calcium sulfite in powder or its equivalent in solution.

Where the rubber is exceedingly putrified and in a sticky condition, I reduce the proportion of tartar emetic and correspondingly increase the calcium or other metallic sulfite.

After the immersion of the rubber in the above solution it is taken out and hung up to dry in a current of cold or warm air, which dries it in a few hours, or the drying may be still more accelerated by placing the wet rubber in a hydro-extractor, and once dry the rubber so prepared does not attract further moisture. It is then rolled out or calendered through cold rollers and cut into any required shape.

Having now described my invention, what I claim, and desire to secure by Letters Patent, is—

1. The solution for the treatment of decayed or other rubber consisting of essentially tannic acid and metallic salts, such as tartar emetic, and sulfites.

2. For the treatment of decayed or deteriorated rubber by long immersion, a solution of thirty or forty gallons of boiling water, containing about five pounds of tartar emetic, mixed afterward with seven and one-half pounds of tannic acid and about two and one-half pounds of a metallic sulfite salt such as calcium sulfite, substantially as described.

3. For the treatment of decayed or deteriorated rubber by long immersion, a solution of thirty to forty gallons of boiling water, containing tartar emetic, mixed afterward with seven and one-half pounds of tannic acid and about two and one-half pounds of a metallic sulfite salt such as calcium sulfite, substantially as described.

In witness whereof I have hereunto set my hand in presence of two witnesses.

MAXIMILIAN ZINGLER.

Witnesses:
JOHN C. FELL,
CHARLES CARTER.